S. D. Simmons,
Bread Cutter

№ 65,441. Patented June 4, 1867.

Witnesses
Theo Fuscke
J. A. Service

Inventor
S D Simmons
Per Munn & Co
Attorneys

United States Patent Office.

S. D. SIMMONS, OF BROOKLYN, E. D., NEW YORK.

*Letters Patent No. 65,441, dated June 4, 1867.*

IMPROVED BREAD-CUTTER.

*The Schedule referred to in these Letters Patent and making part of the same.*

TO ALL WHOM IT MAY CONCERN:

Be it known that I, S. D. SIMMONS, of Brooklyn, E. D., in the county of Kings, and State of New York, have invented a new and improved Bread-Cutting Machine, and that the following description, taken in connection with the accompanying drawings, hereinafter referred to, forms a full and exact specification of the same, wherein I have set forth the nature and principles of my said improvements by which my invention may be distinguished from all others of a similar class, together with such parts as I claim, and desire to have secured to me by Letters Patent.

This invention relates to a new and improved device for cutting bread, and is an improvement on a machine for the same purpose for which Letters Patent were granted to me bearing date July 25, 1865.

The object of the present invention is to simplify the construction of the machine, reduce the cost of manufacture, and render it capable of being operated with far greater facility than hitherto. In the accompanying sheet of drawings—

Figure 1:
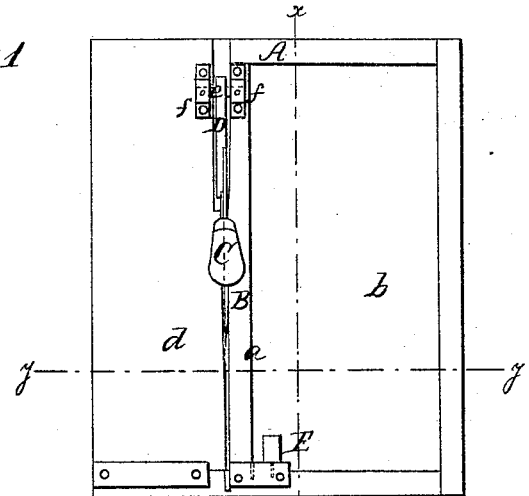

Figure 1 is a plan or top view of my invention.

Figure 2:
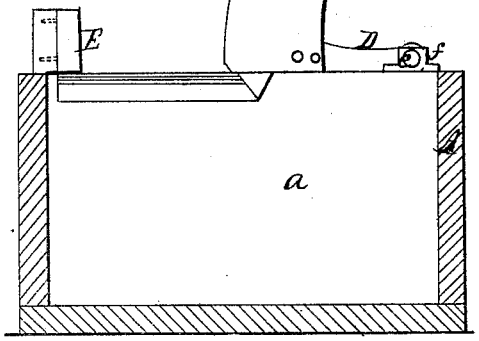

Figure 2, a vertical section of the same, taken in the line $x\ x$, fig. 1.

Figure 3:
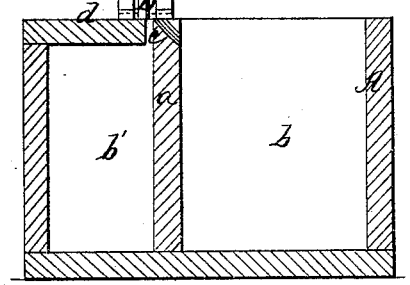

Figure 3, a vertical section of the same, taken in the line $y\ y$, fig. 1.

Similar letters of reference indicate like parts.

A represents a rectangular box in which there is a vertical partition, $a$, to divide it into two compartments $b\ b'$, one of which, $b'$, is covered at the top, and has a space, $c$, allowed between the inner edge of the top or cover $d$ and the upper edge of the partition $a$ to allow the knife B to work through. The knife B has a curved edge, as shown clearly in fig. 2, provided with a handle, C, at one end, and having a bar, D, attached to its opposite end about at right angles, which bar is provided with pivots $e$, the latter working in bearings $f$, one of which is secured to the cover $d$, and the other to the top of the partition $a$, (see figs. 1 and 3.) E is a gauge or stop attached to the inner side of the compartment $b$ of the box A to regulate the thickness of the slices of bread to be cut.

The bread is placed on the top or cover $d$, and is adjusted against the gauge or stop E, and the knife B brought down through it to cut off a slice which falls into the compartment $b$, one slice being cut at a time. The bar D, it will be seen, admits of the knife B having a drawing cut, and operating with a facility, far more so than if it were pivoted so that its edge would work radially from a centre. The compartment $b'$ receives the knife as it is brought down and prevents it from coming in contact with any of the slices of bread.

Having thus described my invention, I claim as new, and desire to secure by Letters Patent—

The box A, provided with two compartments $b\ b'$, in combination with the knife B, having the bar D attached at about right angles, with pivots $e$ at its end to work in bearings $f$, and a slit or space, $c$, allowed at the top of the box for the knife as it is brought down to work into the compartment $b'$, substantially as and for the purpose specified.

S. D. SIMMONS.

Witnesses:
  WM. F. McNAMARA.
  ALEX. F. ROBERTS.